3,609,854
METHOD OF FRICTION WELDING
Atsushi Hasui, Tokyo, Japan, assignor to the Director of National Research Institute for Metals, Tomoyoshi Kawada, Tokyo, Japan
Filed July 30, 1968, Ser. No. 748,825
Claims priority, application Japan, Aug. 5, 1967, 42/49,977
Int. Cl. B23k 27/00
U.S. Cl. 29—470.3      2 Claims

ABSTRACT OF THE DISCLOSURE

The disclosure provides a method of and an apparatus for friction welding workpieces in which a first workpiece is secured to a first drive shaft and a second workpiece is secured to a second freely rotatable shaft, the first drive shaft is rotated at a constant speed, the free end of the second workpiece is contacted to the free end of the first workpiece by the axial force so as to freely rotate the second workpiece and accelerate the rotation of the second workpiece to reach the rotational speed of the first workpiece, and during which period a weld is completed, and simultaneously, flash forming at the joint of workpieces during friction welding can be removed.

---

This invention relates to a method of and an apparatus for friction welding workpieces by utilizing frictional heat.

According to this invention, the friction welding can be performed during the rotation of workpieces to be processed, and simultaneously, the flash or upset forming at the joint of workpieces during friction welding can be removed. Thus, by the time when friction welding is completed the flash has been removed and machined. And consequently, according to this invention, the speed and efficiency of the production is remarkably improved.

As is generally known, there are two methods of friction welding, one of wihch is called the conventional method and the other is the flywheel method. According to the conventional method, workpieces are aligned axially each other and one workpiece is secured to the rotating shaft and the other workpiece is held stationary, so as to rotate the former workpiece against the latter workpiece. The front end of the workpiece secured to the rotating shaft is abutting to the front end of the stationary workpiece and the former workpiece is rotated under the axial force. Then the abutted surfaces and the neighbourhood thereof of the workpieces are heated by the frictional heat to be softened and become plastic state. When heated sufficiently to accomplish a weld, a mechanical brake is applied to stop relative rotation between workpieces. According to the flywheel method, one workpiece is chucked to the rotating shaft, on which flywheels are provided. The rotating shaft with workpiece and flywheels is preliminarily rotated so as to store the desired kinetic energy in flywheels. Then the front end of the other workpiece held stationary is press contacted to the front end of the rotating workpiece. Then stored kinetic energy is discharged and converted into frictional heat at the contact area to make the contact area and the vicinity thereof of the workpieces is softened and becomes plastic state and when the rotation of the shaft is stopped a weld is finished. Flywheels are selected to store sufficient enough kinetic energy for completing a weld until the energy is exhausted. In both prior methods, it is apparent that weld is completed when the rotation of the workpieces is stopped.

In the friction welding machine of this invention, after workpieces have been unitary welded by the completion of friction welding, the workpieces are still rotated, if desired, and it essentially differs from the two prior systems. Due to this essential difference, as will be clarified in the following description, the present invention enables high efficiency production of elements and members in various kinds of machines and devices. Furthermore, the joint portion of the workpieces exhibits excellent quality.

In another aspect, the flash or upset is usually formed at the joint portion of the workpieces. In accordance with prior methods as explained hereinbefore, if removing of flash from the joint portion is required, a flash removing equipment must be provided. It is to be noted however, that it is difficult to remove the highly hardened flash due to quenching effect after welding. Even for the flash not so hardened, the flash removing process and equipment are required to remove the flash after the welding is finished. If the flash at the joint portion can be removed simultaneously during the welding cycle, it is apparent that the versatility, productivity and production efficiency of using the friction welding process shall be increased considerably.

According to the present invention it is possible to remove the flash as it is formed at the joint portion. Since flash removing during the welding process, in which the workpieces are heated, keeps the contact area of the workpieces unchanged, which results in the true welding pressure at the contact area of workpieces. The welding pressure P is defined as axial press contacting force P' divided by the original sectional area of the workpiece A. According to the prior arts the area A is increasingly changed as the flash is formed so that the welding pressure is lowered, but in accordance with the present invention, the flash can be removed by a simple cutting tool during welding process so that the contact area is always kept constant. Therefore, a superior weld may be obtained even by a lower welding force than by said prior methods for welding workpieces of the same size.

The friction welding process and apparatus of this invention can be applicable to all materials, particularly, for example, in welding of plain carbon steel to plain carbon steel, stainless steel to plain carbon steel, stainless steel to stainless steel, high speed steel to high speed steel, and chromium-molybdenum steel to chromium-molybdenum steel.

The friction welding process and apparatus of this invention is characterized by keeping the rotational speed of a first workpiece chucked to the driving shaft as constant at N, holding a second workpiece on the freely rotatable shaft, contacting the second workpiece, which is stationary at this moment, to the drived first workpiece, accelerating the rotation of the rotatable shaft to some rotational speed $n$ (where $n<N$) by frictional force developed at the contact area between both workpieces and axial force applied thereon and during this period heating the contact area and its vicinity to a forging temperature by the frictional heat converted from the frictional force, completing a weld when rotational speed $n$ reaches the rotational speed of N and then stopping the rotation of the first workpiece. And if desired, which is preferable, the removing of the flash which is formed during the welding is processed by externally contacting a cutting tool to the contact area during the heating phase.

The above and other features and advantages of the present invention are more clearly understood when reading the following description in conjunction with illustrative embodiments shown in the attached drawing, in which:

FIGS. 1, 2, 3, 4 and 5 show the principle of the friction welding carried out on workpieces to be processed according to the friction welding process in accordance with the present invention, FIG. 1 shows the state of the workpieces before contacted, FIG. 2 shows the state when they are contacted, FIG. 3 shows the process during the friction welding, FIG. 4 shows the state of the final process of the friction welding, and FIG. 5 shows the state of the workpieces after welded as they are kept stationary;

Figure 1:
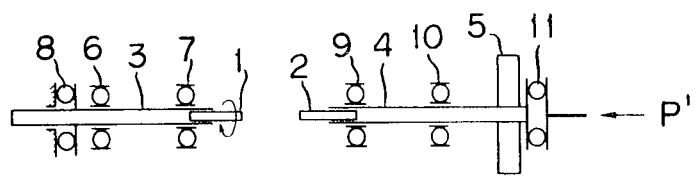
Figure 6:
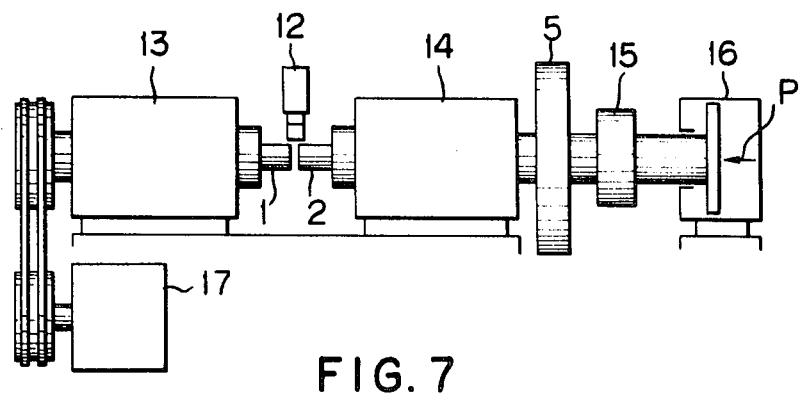
FIG. 6 shows an embodiment of the apparatus for processing the present invention.

FIG. 1 shows the state of the workpieces to be processed before it is contacted, and one of the workpieces 1 is attached to the rotatable shaft 3, which is rotated by a driving mechanism 17 in FIG. 6. The other workpiece 2 is attached on the freely rotatable shaft 4 (which is not rotated in the state as is shown in FIG. 1), and said workpiece 2 is axially pushed towards the workpiece 1 on the rotatable shaft 3 by the shaft 4 which receives the force P' in the axial direction from the pressure system 16 in FIG. 6.

It is to be noted that the pressure system 16 can be provided on the same side as the driving mechanism.

The flywheel 5 which becomes rotational mass is attached to the freely rotatable shaft 4; 6, 7 and 8 show the bearings for making the rotation of the shaft 3 smooth under the actuation of the shaft force P', and 9, 10, and 11 are bearings for making the rotation of the freely rotatable shaft 4 smooth under the actuation of the shaft force P'. In the drawings from FIG. 2 forwards, the numeral numbers of the workpieces to be processed and the parts of the machine are all omitted because they correspond to the numeral numbers of FIG. 1.

Figure 2:
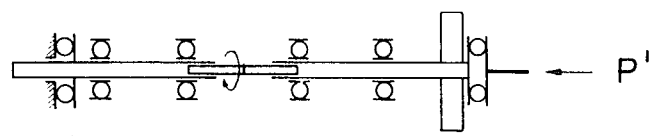
Figure 3:
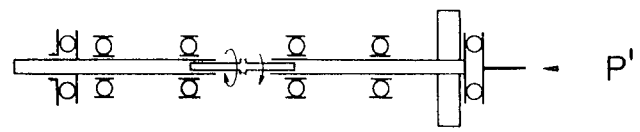

FIG. 2 shows the moment when the open end surface of the workpieces to be processed are contacted. After the contact of the workpieces, the rotation of the driving rotary shaft 3 is kept constant so that the shaft 4 and the workpiece 2 which has been kept stationary starts to rotate and the relative speed between the contact surfaces of the two workpieces 1 and 2 shall be lowered.

The number of rotation $n$ of the shaft 4 is accelerated by the frictional force of the two workpieces, and is elevated till at last it becomes the same as the number of rotation $N$ of the rotary shaft 3 driven by the driving mechanism 17 in FIG. 6.

In other words, the relative speed between the contact surfaces of the two workpieces is reduced gradually and at last it becomes zero, namely, $n$ becomes equal to $N$.

Figure 4:
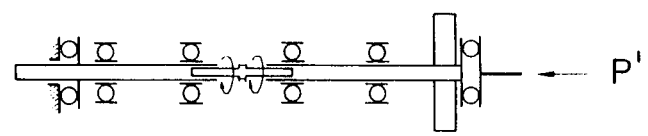
Figure 5:
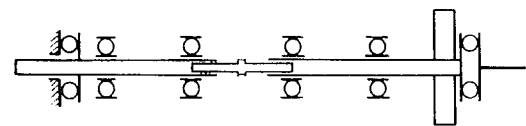

FIG. 4 shows the above mentioned state, and when the relative speed of the contact surfaces of the workpieces is reduced to be zero, the generation of frictional heat is stopped. By this time, the contact surfaces of the two workpieces and the neighbourhood thereof are sufficiently heated to become plastic state, and therefore the friction welding of the two workpieces is completed by the power in the axial direction operated by the pressure system. Next, the rotation of the shaft is stopped as shown in FIG. 5.

FIG. 6 shows an embodiment of the friction welding machine of this invention, in which 1 is workpiece to be processed, and 5 is the rotary mass such as for example flywheel, and 13 is the supporter of the bearings 6, 7, and 8 is FIG. 1, and 14 is the supporter of the bearings 9 and 10 of FIG. 1; 15 is the supporter of the bearing 11 in FIG. 1; 16 is the pressure system for working the force P' in axial direction; 17 is the driving system; 12 is the cutter for removing the flash generated on the outer surface, of the contact area of the workpieces.

On the other hand, in accordance with this invention it is very easy to adjust the press-contacting condition in various ways in so far as friction welding machine of this invention is concerned. When the inertia moment of the rotatable members on the freely rotatable shaft 4 inclusive of the wheel 5 is set to be I, and the angular velocity of the rotary shaft 3 is set to be $\omega$, $\frac{1}{2}I\cdot\omega^2$ of energy is given to the contact surfaces of the two workpieces and to the neighbourhood thereof, and the corresponding frictional heat softens the materials, and welding can be performed.

Therefore the energy required for making satisfactory friction welding is different depending on the quality and the shape of the workpieces to be welded, and the adjustment can be carried out by adjusting the inertia moment of the wheel 5 and the rotational speed of the rotary shaft 3. And by controlling the force P' in the axial direction, the deforming state of the contact portion and the rate of energy given to this portion are changed to meet the state of the workpiece.

In the friction welding of this invention as in the case of the friction welding of the conventional machines of said two systems, the workpieces at the contact surfaces and the neighborhood thereof during the friction is pressed out towards the outer peripheral direction by the pressure in the axial direction, and flashes are formed.

Thus produced flashes must be removed in most cases when the processed workpieces are used in various kinds of members of machines and tools, and in order to remove the flashes, the separate process must be carried out in prior arts for removing flashes, after having stopped the rotation of the materials having been welded.

On the other hand, when the friction welding machine of this invention is used, as mentioned above, after the process shown in FIG. 2, the two workpieces are rotated, and therefore when the rotation of the workpiece 2 arrives at a speed at which the flash can be cut off, the flash is removed along with the progress of the friction welding by positioning an edge of the cutter at the portion where flash is formed. In addition to that, the operation for removing the flash can be remarkably easily carried out because the flash is removed as it is produced.

Moreover, even when the workpiece is such a material which cannot be easily removed at a room temperature or is hardened by the frictional heat, the flash removing is carried out by means of perfectly high temperature cutting. This is a great advantage of this invention, and when the friction welding machine of this invention is used, it is possible to remarkably improve the friction welding efficiency and the production speed.

Figure 7:
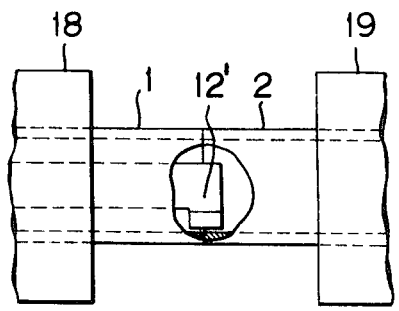
FIG. 7 shows the method for removing the flash formed at the inner surface of the contact portion of the tube like workpieces.
Figure 8:
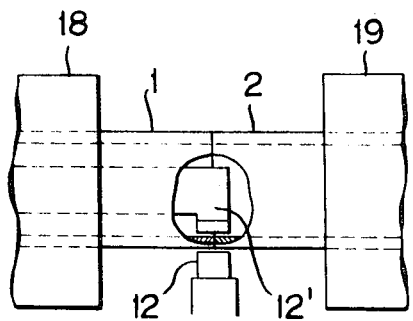
FIG. 8 shows the method for removing the flash formed at the inner and outer surfaces of the contact portion of the tube like workpieces.

FIG. 7 and FIG. 8 are the embodiments in which the cutter for removing the flash along with the progress of the friction welding process of this invention is positioned at the portion where flash is generated between the workpieces, and in FIG. 7 the embodiment in which the workpieces to be processed are in the form of a pipe, is given. In other words, this embodiment shows the case in which the flash generated inside the pipe from material is removed with the cutter 12' during the press-contacting process, and 18 and 19 are the tools for retaining the workpieces 1 and 2. FIG. 8 shows the case in which the flash is simultaneously removed with the cutter 12 and the cutter 12' during the press-contacting process.

The following is an example of the friction welding test carried out by using the friction welding machine of this invention.

The test piece which is a rolled steel S25C rod has the diameter of 19.0 mm., the tensile strength thereof being 55.0 kg./mm.². The inertia moment I on the side of the freely rotatably shaft 4 is $1.94 \times 10^{-2}$ kg.·m.·sec.². In this test, the number of rotation of the rotary shaft 3 is 2910 r.p.m. Therefore, about 901 kg.·m.· of energy, i.e. $\frac{1}{2}I\omega^2$, is charged during the friction welding from the process of FIG. 2 to the proces of FIG. 4.

The four kinds of welding pressure P, in the axial direction used in this test are 6, 9, 12 and 15 kg./mm.², respectively.

The result of the friction welding is as follows.

| Welding pressure (kg./mm.²) | Friction welding time (sec.) | Tensioning test of friction-welded portion | |
|---|---|---|---|
| | | Tensile strength (kg./mm.²) | Broken portion |
| 6 | 0.57 | 58.0 | Mother material. |
| 9 | 0.52 | 55.6 | Do. |
| 12 | 0.54 | 58.2 | Do. |
| 15 | 0.54 | 56.3 | Do. |

It is noted that the friction welding time means the time between the time when workpieces are contacted and the time when the relative rotational speed of workpieces becomes zero.

From the above given result, it is apparent that the quality of the friction welded portion obtained in accordance with the friction welding machine of this invention is excellent.

The present invention is not to be limited to the above exemplified embodiments, but there are many modifications within the scope of the appended claims. For example, it is possible to forcibly keep at rest the workpiece 2 after the workpieces 1 and 2 were contacted until the flash begins to form at the contact area and then the workpiece 2 is made freely rotatable. In this case, welding pressure is controlled to be gradually raised until the flash is formed at the contact portion. This is preferable for avoiding the shock produced when two workpieces are contacted.

What is claimed is:

1. A friction welding process comprising the steps of rotating a first workpiece at a constant speed N, securing a second workpiece on a freely rotatable shaft, engaging the surface to be welded of the second workpiece with the surface to be welded of the first workpiece, applying an axial force in engaging the workpiece surfaces for rotating and accelerating the rotational speed of the second workpiece to a value $n$ which is less than the rotational speed N of the first workpiece by the frictional forces developed between the two surfaces to be welded, the frictional heat developed by the frictional forces heating the engaging surfaces of the two workpieces to a forging temperature to provide a plastic characteristic to said surfaces, completing the weld when the rotational speed $n$ of the second workpiece due to the frictional forces generated equals the rotational speed N of the first workpiece, and removing the flash formed at the engaging surfaces of the workpieces during the welding process.

2. A friction welding process according to claim 1, wherein the second workpiece is held stationary upon engagement of the two surfaces to be welded, then releasing the second workpiece when the flash is formed to permit rotation of the second workpiece by the frictional forces generated between the engaging surfaces of the two workpieces.

References Cited

UNITED STATES PATENTS

| 3,452,914 | 7/1969 | Oberle et al. | 228—2 |
| 3,438,561 | 4/1969 | Calton | 228—13 |
| 3,417,457 | 12/1968 | Burke et al. | 29—470.3 |
| 3,337,108 | 8/1967 | Taylor | 228—2 |
| 3,269,002 | 8/1966 | Hollander et al. | 228—2 |
| 2,393,883 | 1/1946 | Broaderson | 250—71 |

JOHN F. CAMPBELL, Primary Examiner

R. J. CRAIG, Assistant Examiner

U.S. Cl. X.R.

156—73; 228—2